(12) United States Patent
Ratto et al.

(10) Patent No.: US 7,993,524 B2
(45) Date of Patent: *Aug. 9, 2011

(54) MEMBRANES WITH EMBEDDED NANOTUBES FOR SELECTIVE PERMEABILITY

(75) Inventors: Timothy V. Ratto, Oakland, CA (US); Jason K. Holt, Berkeley, CA (US); Alan W. Szmodis, Oakland, CA (US)

(73) Assignee: NanOasis Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/491,867

(22) Filed: Jun. 25, 2009

(65) Prior Publication Data

US 2010/0025330 A1    Feb. 4, 2010

Related U.S. Application Data

(63) Continuation-in-part of application No. 12/269,714, filed on Nov. 12, 2008.

(60) Provisional application No. 61/077,088, filed on Jun. 30, 2008.

(51) Int. Cl.
*B01D 61/00* (2006.01)
*B01D 39/00* (2006.01)
*B01D 39/14* (2006.01)
*B01D 29/00* (2006.01)
*B95D 5/00* (2006.01)

(52) U.S. Cl. .............. 210/652; 210/480; 210/500.38; 210/502.1; 210/500.27; 427/244; 427/245; 264/165; 423/447.3; 428/378

(58) Field of Classification Search ............ 210/500.27, 210/500.38, 490, 500.41, 651, 652; 427/244, 427/245; 264/165, 239, 254; 423/447.3, 423/447.5; 428/375; 997/DIG. 1, 750, 752
See application file for complete search history.

(56) References Cited

U.S. PATENT DOCUMENTS

| | | | |
|---|---|---|---|
| 4,277,344 A | | 7/1981 | Cadotte |
| 4,611,053 A | | 9/1986 | Sasa |
| 5,824,689 A | * | 10/1998 | Lee et al. ............. 514/312 |
| 5,968,650 A | | 10/1999 | Tennett et al. |
| 6,099,965 A | | 8/2000 | Tennett et al. |
| 6,162,358 A | * | 12/2000 | Li et al. ............. 210/500.38 |
| 6,426,134 B1 | * | 7/2002 | Lavin et al. ............ 428/300.1 |
| 6,471,936 B1 | | 10/2002 | Chen et al. |

(Continued)

FOREIGN PATENT DOCUMENTS

WO    WO 2006/060721 A1    6/2006

(Continued)

OTHER PUBLICATIONS

Corry, Ben; "Designing Carbon Nanotube Membranes for Efficient Water Desalination"; 2008, *J. Phys. Chem.*, vol. 12, pp. 1427-1434.

(Continued)

*Primary Examiner* — Ana Fortuna
(74) *Attorney, Agent, or Firm* — Kilpatrick Townsend and Stockton LLP.

(57) ABSTRACT

Membranes for filtration by size exclusion are formed from open-ended nanotubes embedded in a polymeric matrix. The matrix forms a layer whose thickness is substantially less than the average length of the nanotubes, allowing the nanotubes to be randomly oriented throughout the matrix while providing channels extending through the layer for the selective passage of molecular species or particles based on size.

58 Claims, 2 Drawing Sheets

U.S. PATENT DOCUMENTS

| | | | |
|---|---|---|---|
| 6,511,527 B2 | 1/2003 | Yang et al. | |
| 6,824,689 B2 | 11/2004 | Wang et al. | |
| 6,858,197 B1 * | 2/2005 | Delzeit | 423/447.3 |
| 6,863,942 B2 * | 3/2005 | Ren et al. | 428/36.9 |
| 6,878,278 B2 | 4/2005 | Mickols | |
| 6,919,002 B2 | 7/2005 | Chopra | |
| 7,011,760 B2 | 3/2006 | Wang et al. | |
| 7,077,939 B1 | 7/2006 | Crooks et al. | |
| 7,148,260 B2 | 12/2006 | Dietz | |
| 7,148,269 B2 * | 12/2006 | Winey et al. | 523/218 |
| 7,196,122 B2 | 3/2007 | Ryoo et al. | |
| 7,205,069 B2 * | 4/2007 | Smalley et al. | 429/129 |
| 7,211,320 B1 * | 5/2007 | Cooper et al. | 428/306.6 |
| 7,229,556 B1 | 6/2007 | Hinds, III et al. | |
| 7,290,667 B1 | 11/2007 | Bakajin et al. | |
| 7,301,191 B1 | 11/2007 | Tombler et al. | |
| 7,419,601 B2 | 9/2008 | Cooper et al. | |
| 7,419,624 B1 | 9/2008 | Smalley et al. | |
| 7,438,193 B2 | 10/2008 | Yang et al. | |
| 7,459,121 B2 * | 12/2008 | Liang et al. | 264/555 |
| 7,544,626 B2 * | 6/2009 | Tang et al. | 438/800 |
| 7,611,628 B1 * | 11/2009 | Hinds, III | 210/500.27 |
| 7,623,340 B1 * | 11/2009 | Song et al. | 361/502 |
| 7,695,550 B2 | 4/2010 | Krupenkin et al. | |
| 7,771,784 B2 | 8/2010 | Loutfy et al. | |
| 2003/0121857 A1 | 7/2003 | Kurth et al. | |
| 2003/0180526 A1 * | 9/2003 | Winey et al. | 428/323 |
| 2004/0173506 A1 * | 9/2004 | Doktycz et al. | 210/85 |
| 2005/0183405 A1 * | 8/2005 | Gillingham et al. | 55/486 |
| 2006/0051579 A1 | 3/2006 | Chokai et al. | |
| 2006/0122284 A1 | 6/2006 | Rodriguez-Macias et al. | |
| 2007/0137477 A1 | 6/2007 | Freeman et al. | |
| 2008/0041791 A1 | 2/2008 | Cooper et al. | |
| 2008/0149561 A1 | 6/2008 | Chu et al. | |
| 2008/0220241 A1 | 9/2008 | Abdelsalam et al. | |
| 2008/0223795 A1 | 9/2008 | Bakajin et al. | |
| 2008/0290020 A1 | 11/2008 | Marand et al. | |
| 2008/0302243 A1 | 12/2008 | Byrd et al. | |
| 2009/0121182 A1 | 5/2009 | Ajayan et al. | |
| 2009/0142576 A1 | 6/2009 | Liu et al. | |
| 2009/0184047 A1 | 7/2009 | Thayumanavan et al. | |
| 2009/0283475 A1 | 11/2009 | Hylton et al. | |
| 2009/0283480 A1 | 11/2009 | Schadler et al. | |
| 2009/0321355 A1 | 12/2009 | Ratto et al. | |
| 2010/0025330 A1 | 2/2010 | Ratto et al. | |
| 2010/0098877 A1 | 4/2010 | Cooper et al. | |
| 2010/0116751 A1 | 5/2010 | Bajpai et al. | |
| 2010/0119422 A1 | 5/2010 | Holmes et al. | |
| 2010/0203521 A1 | 8/2010 | Klapperich et al. | |

FOREIGN PATENT DOCUMENTS

| | | | |
|---|---|---|---|
| WO | WO 2006/060721 | * | 8/2006 |
| WO | WO 2006/098872 A2 | | 9/2006 |
| WO | WO 2007/025104 A2 | | 3/2007 |
| WO | WO 2008/028155 A2 | | 3/2008 |
| WO | WO 2008/048227 A2 | | 4/2008 |
| WO | 2009148959 A2 | | 12/2009 |

OTHER PUBLICATIONS

Hinds, Bruce J. et al.; "Aligned Multiwalled Carbon Nanotube Membranes"; 2004; *Science*, vol. 303, pp. 62-65.

Holt, Jason K. et al.; "Fast Mass Transport Through Sub-2-Nanometer Carbon Nanotubes"; 2006, *Science*, vol. 312, pp. 1034-1037.

Kim, Sangil et al.; "Scalable Fabrication of Carbon Nanotube/Polymer Nanocomposite Membranes for High Flux Gas Transport"; 2007, *Nano Letters*, vol. 7, No. 9, pp. 2806-2811.

Majumder, Mainak et al.; "Enhanced electrostatic modulation of ionic diffusion through carbon nanotube membranes by diazonium grafting chemistry"; 2007, *Journal of Membrane Science*, 8 pages.

Kim et al., "Scalable Fabrication of Carbon Nanotube/Polymer Nanocomposite Membranes for High Flux Gas Transport," ACS Publications, Nanoletters 2007.

Hinds et al., "Aligned Multiwalled Carbon Nanotube Membranes," Science vol. 303, No. 5654 (2004).

Holt et al., "Fast Mass Transport Through Sub-2-Nanometer Carbon Nanotubes," Science vol. 312, No. 5776 (2006).

\* cited by examiner

MEMBRANES WITH EMBEDDED NANOTUBES FOR SELECTIVE PERMEABILITY

CROSS-REFERENCES TO RELATED APPLICATION

This application is a continuation-in-part of co-pending U.S. application Ser. No. 12/269,714, filed Nov. 12, 2008, which claims the benefit of U.S. Provisional Patent Application No. 61/077,088, filed Jun. 30, 2008. The contents of both such applications are incorporated herein by reference in their entirety.

BACKGROUND OF THE INVENTION

1. Field of the Invention

This invention resides in the field of membranes for reverse osmosis, with particular interest in the desalination of water. This invention also relates to the uses of nanotubes and to structures incorporating nanotubes.

2. Description of the Prior Art

Porous polymeric membranes have been widely studied as reverse osmosis media for the purification of fluids. The most common reverse osmosis membranes are those utilizing a solution-diffusion mechanism in which the species of interest (water in the case of desalination) both dissolves in and diffuses through the membrane material at a faster rate than other species in the feed fluid (for example, salt). Examples of such membranes are those disclosed by Cadofte, J. E., U.S. Pat. No. 4,277,344, issued Jul. 7, 1981, and Hoek, E., et al (The Regents of the University of California), International (PCT) Patent Application Publication No. WO 2006/098872 A2, publication date Sep. 21, 2006. Unfortunately, membranes operating by the solution-diffusion process provide only a low flux of the desired species, and although the flux can be increased by modifications of the membrane parameters, such modifications are typically detrimental to the rejection performance of the membrane, i.e., they tend to lower the purity of the permeate.

The use of nanotubes presents an alternative to the traditional solution-diffusion polymeric membrane since nanotube channels themselves offer selectivity in molecular transport. Water molecules, for example, pass through nanotube channels at a significantly faster rate than salt ions or other species whose molecular size exceeds that of water. Prominent among the nanotube-containing structures that are designed for this purpose are those in which the nanotubes are attached to a silicon chip, as disclosed by Holt, J., et al (Regents of the University of California), International (PCT) Patent Application Publication No. WO 2007/025104 A2, publication date Mar. 1, 2007, and by Holt, J. K., et al., "Fast Mass Transport Through Sub-2-Nanometer Carbon Nanotubes," *Science* 312, 1034-1037 (19 May 2006). The membranes in these disclosures are formed growing a dense, vertically-aligned array of double-wall carbon nanotubes (DWCNTs) on the surface of the chip by chemical vapor deposition (CVD), followed by the deposition of silicon nitride, also by CVD, to fill the gaps between the DWCNTs.

SUMMARY OF THE INVENTION

It has now been discovered that a membrane containing nanotubes embedded in a polymeric matrix such that molecular species selectively pass through the nanotubes on a size-exclusion basis can be fabricated by polymerizing monomers or prepolymers, i.e., polymerizable species in general, from liquid media in which open-ended nanotubes are suspended in random orientations, and sealing the matrix to form a substantially continuous barrier around the nanotubes. The ability of the nanotubes to pass molecular species in a selective manner can be achieved without imposing any particular alignment on the nanotubes while the nanotubes are in suspension in the liquid. Once the suspension is formed and the polymerizable species are dissolved in the appropriate liquid media, the membrane is formed by contact of the liquids to cause the species to polymerize at the liquid interface(s). While the continuous barrier may serve as a solution/diffusion membrane with reverse-osmosis activity of its own, the size-exclusion action of the nanotubes enhances both the selectivity and the permeability of the membrane. The membranes of this invention have applications in various modes of filtration, including nanofiltration, ultrafiltration, gas separation, and reverse osmosis. The membranes are particularly useful as reverse osmosis membranes, notably for desalination of water.

Membranes within the scope of this invention are those that are formed by interfacial polymerization of polymerizable species that are distributed between two liquid phases. In a further aspect, this invention resides in a method of fabricating these membranes over a microporous support by first wetting the support with one of the two liquid phases, then contacting the wetted support with the second liquid phase, followed in certain embodiments of the invention by a third liquid phase, with the nanotubes suspended in one or more of the three phases. Each pair of consecutively applied liquid phases forms a polymer by interfacial polymerization, and the polymer formed by the last pair is sufficiently dense to form the substantially continuous barrier. When only two liquid phases are used, the nanotubes are dispersed in either phase or in both phases, although preferably only the second (later-applied) phase. A single polymeric layer is formed, serving both as a matrix to hold the random orientation of the nanotubes and as the afore-mentioned barrier. When three liquid phases are used, the nanotubes are dispersed in one or two of the three phases, although preferably in either the first phase (with which the support is first wetted) or the second phase (which is applied over the first) or both, and most preferably in the second phase only. Polymerization occurs in two stages when three liquid phases are used, the first stage forming a porous polymer over the support and the second a non-porous, or substantially non-porous, polymer over the porous polymer. The porous polymer can then serve as an anchor to fix the lower ends of the nanotubes while preventing them from being clogged by polymer, and the nonporous polymer can serve as the barrier. In either the two-phase or three-phase protocols, the various polymerizations are conducted such that the thickness of the barrier is less than the average lengths of the nanotubes. In a still further aspect, this invention resides in the membranes themselves, as well as methods of performing reverse osmosis, including desalination, by the use of such membranes.

One advantage of this invention is that membranes within its scope can be manufactured in relatively large dimensions, suitable for use in high-throughput and high-volume applications. The manufacturing processes are thus not limited to dimensions on the order of a silicon chip such as those of the prior art methods referenced above. A further advantage is the relatively low cost of the manufacturing procedure and thus of the resulting membranes, since the procedure does not require costly substrates such as silicon nor costly steps or equipment such as those used in chemical vapor deposition. Nor does the invention require specialized methods for fabrication of the nanotubes. The nanotubes can instead be obtained in bulk, synthesized by any known technique, and if the nanotubes are not already open-ended they can be treated by simple and inexpensive means to achieve open ends. A still further advantage, and one that this invention has in common with other filtration systems that utilize nanotubes as the filtration medium, is that the filtration behavior of the membrane, notably its molecular weight cutoff (MWCO), can be closely controlled by the selection of nanotubes of the appropriate internal diameter. The MWCO will thus be independent of the polymerization conditions provided that the barrier thus formed is continuous and essentially pore-free.

These and other features, aspects, objects, and advantages of the invention are further explained in the descriptions that follow.

DETAILED DESCRIPTION OF THE INVENTION AND PREFERRED EMBODIMENTS

Figure 1:
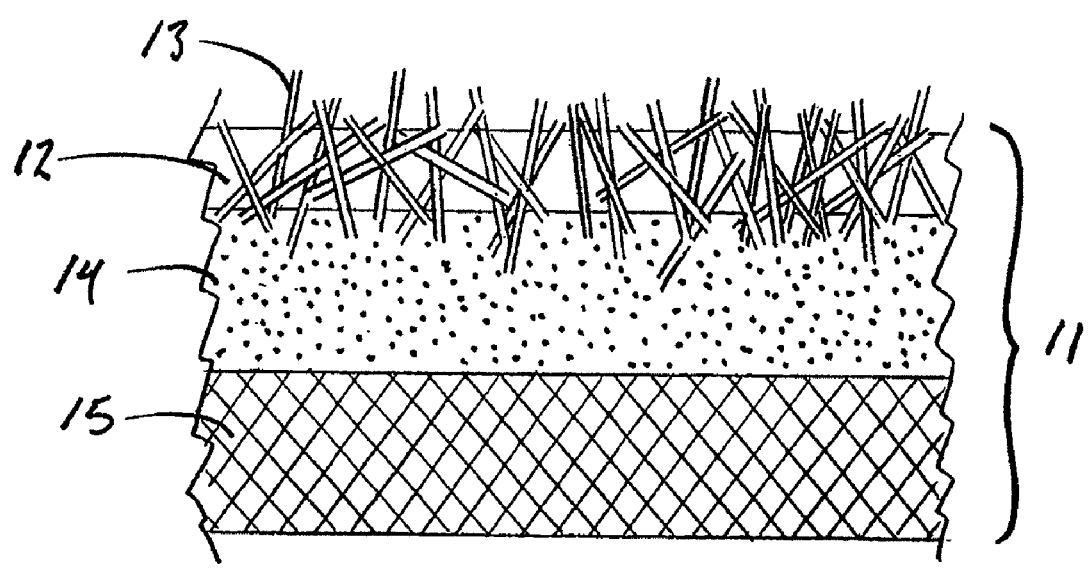
FIG. 1 is a cross section of one example of a membrane in accordance with the present invention.

Nanotubes are cylindrical tubular structures that are well known in the art and commercially available. Nanotubes of a variety of materials have been studied, notably carbon nanotubes, boron nanotubes, and nanotubes of boron nitride. Those that have been most extensively studied are carbon nanotubes, whose features and methods of fabrication are illustrative of nanotubes in general.

Carbon nanotubes are polymers of pure carbon, and exist as both single-wall and multi-wall structures. Examples of publications describing carbon nanotubes and their methods of fabrication are Dresselhaus, M. S., et al., *Science of Fullerenes and Carbon Nanotubes*, Academic Press, San Diego (1996), Ajayan, P. M., et al., "Nanometre-Size Tubes of Carbon," *Rep. Prog. Phys.* 60 (1997): 1025-1062, and Peigney, A., et al., "Carbon nanotubes in novel ceramic matrix nanocomposites," *Ceram. Inter.* 26 (2000) 677-683. A single-wall carbon nanotube is a single graphene sheet rolled into a seamless cylinder with either open or closed ends. When closed, the ends are capped either by half fullerenes or by more complex structures such as pentagonal lattices. The average diameter of a single-wall carbon nanotube typically ranges of 0.6 nm to 100 nm, and in many cases 1.5 nm to 10 nm. The aspect ratio, i.e., length to diameter, typically ranges from about 25 to about 1,000,000, and most often from about 100 to about 1,000. A nanotube of 1 nm diameter may thus have a length of from about 100 to about 1,000 nm. Nanotubes frequently exist as "ropes," which are bundles of 3 to 500 single-wall nanotubes held together along their lengths by van der Waals forces. Individual nanotubes often branch off from a rope to join nanotubes of other ropes. Multi-walled carbon nanotubes are two or more concentric cylinders of graphene sheets of successively larger diameter, forming a layered composite tube bonded together by van der Waals forces, with a distance of approximately 0.34 nm between layers.

Carbon nanotubes can be prepared by arc discharge between carbon electrodes in an inert gas atmosphere. This process results in a mixture of single-wall and multi-wall nanotubes, although the formation of single-wall nanotubes can be favored by the use of transition metal catalysts such as iron or cobalt. Single-wall nanotubes can also be prepared by laser ablation, as disclosed by Thess, A., et al., "Crystalline Ropes of Metallic Carbon Nanotubes," *Science* 273 (1996): 483-487, and by Witanachi, S., et al., "Role of Temporal Delay in Dual-Laser Ablated Plumes," *J. Vac. Sci. Technol. A* 3 (1995): 1171-1174. A further method of producing single-wall nanotubes is the high-pressure carbon monoxide conversion ("HiPCO") process disclosed by Nikolaev, P., et al., "Gas-phase catalytic growth of single-walled carbon nanotubes from carbon monoxide," *Chem. Phys. Lett.* 313, 91-97 (1999), and by Bronikowski, M. J., et al., "Gas-phase production of carbon single-walled nanotubes from carbon monoxide via the HiPco process: A parametric study," *J. Vac. Sci. Technol.* 19, 1800-1805 (2001).

Certain procedures for the synthesis of nanotubes will produce nanotubes with open ends while others will produce closed-end nanotubes. If the nanotubes are synthesized in closed-end form, the closed ends can be opened by a variety of methods known in the art. An example of a nanotube synthesis procedure that produces open-ended nanotubes is that described by Hua, D. H. (Kansas State University Research Foundation), International (PCT) Patent Application Publication No. WO 2008/048227 A2, publication date Apr. 24, 2008. Closed ends can be opened by mechanical means such as cutting, or by chemical, or thermal means. An example of a cutting method is milling. Chemical means include the use of carbon nanotube degrading agents, an example of which is a mixture of a nitric acid and sulfuric acid in aqueous solution at concentrations of up to 70% and 96%, respectively Another chemical means is reactive ion etching. Thermal means include exposure to elevated temperature in an oxidizing atmosphere. The oxidizing atmosphere can be achieved by an oxygen concentration ranging from 20% to 100% by volume, and the temperature can range from 200° C. to 450° C.

The lengths of the nanotubes can vary widely and are not critical to the invention. The lengths are expressed herein as average lengths, using numerical or arithmetic averages. In preferred embodiments, the average length is from about 100 nm to about 2000 nm, most preferably from about 200 nm to about 1000 nm, whether single-wall, multi-wall, or a combination of single-wall and multi-wall. The outer and inner diameters of the nanotubes can likewise vary. In the most common embodiments, the outer diameters can range from about 0.6 nm to about 200 nm, while narrower ranges are often preferred for particular applications. The inner diameters in the most common embodiments can likewise range from about 0.4 nm to about 200 nm, although the optimal diameters for particular applications may be within narrower ranges. For reverse osmosis, and notably for water desalination, a preferred inner diameter range is about 0.4 nm to about 5 nm, and a most preferred range is from about 0.4 nm to about 1.2 nm. For nanofiltration membranes, a preferred size range is from about 1 nm to about 10 nm. For ultrafiltration membranes, a preferred size range is from about 5 nm to about 200 nm.

When two liquid phases are used, the two phases are at least partially immiscible with each other, and when three liquid phases are used, the second and third phases are at least partially immiscible with the first phase. The second and third phases are not required to be immiscible, partially or otherwise, and as will be seen below, the second and third phases can be, and preferably are, formed with the same solvent. Where two phases are characterized herein as "at least partially immiscible," the quoted expression means that the solvents used in the phases form separate and stable phases at equilibrium, either due to a lack of solubility of one solvent in the other or to a limited solubility of one or both solvents in the other. For solvents with mutual but limited solubilities, each solvent is saturated with the other prior to the placement of the phases in contact, with or without the polymerizable species having first been dissolved therein. Optimally, therefore, the only diffusion, if any, between the phases once contacted will be that of the polymerizable species. Preferably, each pair of "at least partially immiscible" phases consists of a non-polar phase as one of the pair and a polar phase as the other, with non-polar and polar solvents, respectively. Examples of non-polar solvents are benzene, halobenzenes, alkyl benzenes, non-polar alkanes, non-polar haloalkanes, and non-polar alkyl-substituted alkanes. The various substituted benzenes and alkanes include those with single substituents and those with multiple substituents, and the latter include combinations of substituents, such as halo and alkyl, on the same structure, as well as those with two or more alkyl substitutions or two or more halo substitutions. Among the alkanes, $C_5$-$C_{12}$ alkanes are preferred. Other than benzene, specific examples of non-polar solvents are chloroform, toluene, xylene, mesitylene, ortho-dichlorobenzene, hexane, heptane, and tetrachloroethylene. Mixtures of non-polar solvents can also be used, for example, a mixture of hexane and chloroform, preferably at a hexane:chloroform volume ratio of from about 1:1 to about 10:1, more preferably from about 2:1 to about 5:1, and most preferably 3:1. Examples of polar solvents are water, alcohols, and glycols, used either individually or as mixtures. Preferred alcohols are methyl alcohol, ethyl alcohol, and isopropyl alcohol, and preferred glycols are ethylene glycol and propylene glycol.

The term "polymerizable species" as used herein denotes any species that will react in a polymerization reaction. Polymerizable species are either monomers or prepolymers, or a combination of a monomer in one phase and a prepolymer in the other. Polymerizable species that are of use in the present invention are those that are soluble in separate liquid phases with one of the species highly soluble in one phase and soluble to a lesser degree, preferably only slightly soluble, in the other phase, so that the species will traverse the interface to react on the opposing side of the interface with the other species. As an example, when the first liquid phase is a solution of a polar monomer in a polar solvent, and the second is a solution of a non-polar monomer in a non-polar solvent, a preferred polar monomer is one that is slightly soluble in the non-polar solvent. Such a monomer will migrate toward the interface from the first liquid phase and penetrate the second liquid phase to react with the non-polar monomer on the non-polar side of the interface.

Useful polymerizable species are also those that will undergo interfacial polymerization, i.e., that will react at the interface of the two liquid phases, to form a solid continuous polymer that is insoluble in either phase. By "continuous" is meant that the polymer is non-porous, or at least of sufficiently low porosity that, during use of the membrane in desalination or any other purification, concentration, or separation process, no significant amount of any component of the liquid or gas being treated will pass through the polymer itself; i.e., molecular transport will occur only through the nanotube channels. The polymer will form a thin film at the interface, and the thickness of the film will depend on the degree and rate of diffusion of either polymerizable species across the interface as the film is being formed, as well as other common reaction factors such as concentration and temperature, and the polymerization reaction rate. Examples of polymers that can be formed in this manner are polyurethanes, polyphthalamides, polyesters, polysulfonamides, and polyamides. The various monomer combinations that can be used to form these polymers are known in the art. Polyamides are prime examples of the polymers, and can be formed by the reaction between a diacid or polyacid halide in an organic (non-polar) phase and a diamine in an aqueous phase. Examples of diacid and polyacid halides are adipoyl chloride, sebacoyl chloride, and dodecanedioyl chloride, phosgene, bischloroformates, various aromatic diacyl or triacyl chlorides, and various aromatic disulfonyl or trisulfonyl chlorides. Examples of diamines are hexamethylenediamine and decamethylene diamine. Aromatic polyamides, in which either the polyacids (including diacids) or the diamines or both contain aromatic moieties, are of particular interest. Examples of aromatic polyacid halides are trimesoyl chloride (1,3,5-benzenetricarboxylic acid chloride), trimellitic (1,2,4-benzenetricarboxylic) acid chloride, hemimellitic (1,2,3-benzenetricarboxylic) acid chloride, and pyromellitic (1,2,4,5-benzenetetracarboxylic) acid chloride. Examples of aromatic polyamines are phenylene diamines such as ortho-phenylenediamine and meta-phenylenediamine. As for polymers other than polyamides, polyurethanes can be formed from diisocyanates (ethylene diisocyanate, for example) in the non-polar phase and polyols (ethylene glycol, for example) in the polar phase; polyphthalamides can be formed from aromatic acid chlorides (isophthaloyl chloride, for example) in the non-polar phase and piperazines in the polar phase; polyesters can be formed from aromatic acid chlorides (isophthaloyl chloride, for example) in the non-polar phase and a halogenated bisphenol (tetrabromobisphenol, for example) in the polar phase; and polysulfonamides can be formed from disulfonyl chlorides (1,5-naphthalenedisulfonyl chloride, for example) in the non-polar phase and diamines (1,6-hexanediamine, for example) in the polar phase.

The concentrations of the polymerizable species in each liquid phase are not critical to the invention and can vary, although certain applications will have optimal concentrations. These optimal concentrations will also vary among particular combinations of polymerizable species and also with the reaction conditions. In most cases, best results will be obtained with a polymerizable species concentration in the non-polar phase of from about 0.05% to about 3%. A preferred range is from about 0.05% to about 1%, and a most preferred range is from about 0.1% to about 0.3%. Likewise, in the polar phase, best results will be obtained in most cases with a polymerizable species concentration of from about 0.2% to about 5%. A preferred range is from about 0.2% to about 2.0%, and a most preferred range is from about 1.0% to about 2.0%. These percents are weight/volume percents, i.e., grams of the polymerizable species per milliliter of the solution, including the nanotubes when present, times 100. The concentration of the species in the polar phase, particularly when the polar phase is the phase used to wet the microporous support, is preferably in molar excess relative to the concentration of the species in the non-polar phase.

The nanotubes can be initially dispersed in either one liquid phase or more than one. Thus, in procedures in which a microporous support is first wetted with one liquid phase and then contacted with another, the nanotubes can initially reside in either the phase used to wet the support or the phase applied over the wetted support, or both. Similarly, when two phases are characterized as a non-polar phase and a polar phase, the nanotubes can initially reside in either or both of these phases. For purposes of efficiency, however, it is preferred that the nanotubes be dispersed in only one of the phases, and most preferably the phase that is applied over the wetted support to most effectively concentrate the nanotubes in the film being formed at the liquid-liquid interface. Certain nanotubes will be more readily suspended in certain types of solvents, and nanotubes can also be functionalized to promote their dispersion in particular solvents. Carbon nanotubes, for example, will suspend more readily in non-polar solvents than in polar solvents, and in certain embodiments of this invention, therefore, the non-polar solvent with carbon nanotubes suspended therein and a polymerizable species dissolved therein will be used as the liquid phase applied over the microporous support after the support has been wetted with the polar phase. To increase the dispersability of carbon nanotubes in non-polar solvents, the carbon nanotubes can be functionalized with hydrocarbon chains. Such functionalization can be accomplished by treating bare carbon nanotubes or fluorinated carbon nanotubes with alkylating reagents such as butyllithium, pentalithium, and hexyllithium. Alternatively, conjugated or block co-polymers can be used, where one portion of the polymer undergoes pi-pi, non-covalent interactions with the carbon nanotubes and another has a hydrocarbon chain that imparts solubility in the non-polar solvent. When carbon nanotubes are dispersed in the polar phase rather than the non-polar phase, dispersion of the nanotubes can be enhanced by the inclusion of a surfactant. Any of the wide variety of surfactants known in the art can be used. Notable examples are sodium dodecyl sulfate and Triton X-100.

Like the concentrations of the polymerizable species, the concentration of nanotubes are not critical to the invention and can vary, provided that a sufficient number of nanotubes are present per unit volume of the liquid phase in which they are suspended to produce a membrane with a flux great enough to be commercially viable. The concentrations of nanotubes can be expressed in terms of area density, i.e., the number of nanotubes per unit area of the substantially flat or planar surface of one side of the final membrane. For certain applications, a preferred range of area density is from about $1\times10^{11}$ cm$^{-2}$ (nanotubes per square centimeter of membrane surface area) to about $1\times10^{13}$ cm$^{-2}$, and a more preferred range is from about $2.5\times10^{11}$ cm$^{-2}$ to about $2.5\times10^{12}$ cm$^{-2}$. For certain other applications, a preferred density range is from about $2.5\times10^{8}$ cm$^{-2}$ to about $1\times10^{12}$ cm$^{-2}$, and a more preferred density range is from about $2.5\times10^{9}$ cm$^{-1}$ to about $2.5\times10^{11}$ cm$^{-2}$.

Examples of nanotube densities and diameters for various applications are as follows. For membranes of the invention that are used for desalination applications, preferred nanotubes are single-wall carbon nanotubes having outer diameters ranging from about 0.6 nm to about 1.5 nm, preferably from about 0.8 nm to about 1.2 nm, and most preferably from 0.8 nm to 0.9 nm. Preferred nanotube densities for desalination range from about $1\times10^{11}$ cm$^{-2}$ to about $1\times10^{13}$ cm$^{-2}$, most preferably from about $2.5\times10^{11}$ cm$^{-2}$ to about $2.5\times10^{12}$ cm$^{-2}$. For membranes that are used for gas separations, preferred nanotubes are single-wall carbon nanotubes having outer diameters ranging from about 0.6 nm to about 1.0 nm, more preferably from about 0.6 nm to about 0.8 nm, and optimally about 0.7 nm. For these applications, nanotube area densities will preferably range from about $1\times10^{11}$ cm$^{-2}$ to about $1\times10^{13}$ cm$^{-2}$ and most preferably from about $2.5\times10^{11}$ cm$^{-2}$ to about $2.5\times10^{12}$ cm$^{-2}$. For membranes that are used for nanofiltration applications, preferred nanotubes are combinations of single-wall and multi-wall carbon nanotubes having inner diameters ranging from about 1.5 nm to about 10.0 nm, and nanotube area densities will preferably range from about $1\times10^{11}$ cm to about $1\times10^{13}$ cm$^{-2}$. For membranes that are used for ultrafiltration applications and particularly for viral or bacterial filtrations, preferred nanotubes are combinations of single-wall and multi-wall carbon nanotubes having outer diameters ranging from about 10 nm to about 200 nm, and nanotube area densities will preferably range from about $1\times10^{6}$ cm$^{-2}$ to about $1\times10^{11}$ cm$^{-2}$.

As noted above, membranes in accordance with the present invention are readily formed over microporous supports that establish the lateral dimensions and shape of the membranes as they are being formed and that provide the finished membranes with structural stability. A support in accordance with this invention serves these purposes by receiving the first liquid phase during the initial step of the membrane fabrication and retaining the first liquid phase to allow the second liquid phase to contact the first liquid phase at the outer surface of the support, thereby allowing the two phases to form a substantially planar and continuous interface at the support surface. The support can be made of any material that is wettable by the liquid phase that is first placed in contact with the support, inert to the reactants in the polymerization reaction, and stable under the reaction conditions, and one to which the polymer thus formed will adhere. In preferred embodiments, the first liquid phase is a polar phase, most preferably an aqueous phase, and the microporous support is one that is wettable by a polar liquid.

Examples of materials from which the support can be made are polyethersulfones, polysulfones, nylons (and polyamides in general), and polyesters. While the support itself can serve a filtering function by size exclusion, its filtering characteristics if any will be substantially more coarse, due to its microporous nature, than those of the membrane itself and specifically the nanotubes in the membrane. Within this limitation, the porosity of the support can vary widely. In most cases, it will be convenient to use a support with a molecular weight cutoff (MWCO) of from about 1 kDa to about 10 MDa, and preferably from about 5 kDa to about 300 kDa. An example of a microporous support presently contemplated is a polysulfone with MWCO of 10 kDa to 1 MDa, and preferably a polysulfone with MWCO of 300 kDa. In terms of pore size, the microporous support can have pores ranging from 3 nm to 200 nm in diameter.

The dimensions of the microporous support will generally be selected to meet the needs of the particular application. These needs include the lateral area through which fluids will pass when the membrane is used in purification, filtration, or other treatment of the fluids, as well as the pressure differential that will be imposed across the combined support and membrane during use. Preferred supports are those that are capable of withstanding pressure differentials of from about 1 atmosphere to about 85 atmospheres without rupturing. In many applications, the support/membrane combination, which can be referred to as a "composite membrane," is in the form of a flat disk. For these applications, disks of a relatively small size are often the most appropriate, and a preferred diameter range for these applications is from about 10 mm to about 100 mm. Diameters ranging from 13 mm to 47 mm, specifically disks of 13 mm, 25 mm, and 47 mm, are of particular interest. For disks of diameters between 10 mm and 100 mm, the disk thickness preferably ranges from about 0.15 mm to about 0.25 mm. The composite membrane can also be prepared in the form of rectangular sheets having widths ranging from 1 inch (2.5 cm) to 40 inches (102 cm). Widths of 9.75 inches (24.8 cm), 10 inches (25.4 cm), 20 inches (51 cm), and 40 inches (102 cm) are of particular interest. The lengths of the sheets will most often range from about four inches (ten cm) to about 400 feet (122 m). For a sheet of these lateral dimensions, the sheet thickness preferably ranges from about 0.15 mm to about 0.25 mm. In general, the thickness of the support is of less importance than the thickness of the membrane, since the support need only be thick enough to provide structural support for the membrane.

In the first step of the membrane formation procedure, the microporous support is wetted with the first liquid phase. The term "wet" as used herein, including its derivatives "wetting," "wettable," and "wetted," denotes the filling of the pores of the support with the liquid phase such that the liquid-liquid interface that will be formed when the second liquid phase is added is substantially entirely, if not entirely, at the outer (flat) surface of the support, i.e., if the interface extends into the pore interiors it does so only to a negligible degree. Such wetting can be achieved by saturating the microporous support with the first liquid phase, including immersing the support in the liquid long enough to allow escape of all gas bubbles. In some cases, saturation times can range from 1 minute to 60 minutes, preferably from 1 minute to 30 minutes, and most preferably from 1 minute to 10 minutes. In other cases, saturation times can range from 1 hour to ten hours, preferably from 2 hours to five hours.

Once wetted, the microporous support is contacted with the second liquid phase so that the second liquid phase forms a layer over at least one outer surface of the support with the liquid-liquid interface at the outer surface. For a support in the form of a disk or sheet, the second liquid phase can be applied over both sides (top and bottom) of the support. It will generally be preferable however to apply the liquid to only one side by blocking or sealing the other side with a continuous, liquid-impermeable, but removable, barrier. The second liquid phase can be applied by immersing the wetted support in a vessel containing the liquid, or spraying or brush coating the liquid over the wetted support, or any other conventional means of applying a liquid over a wetted solid. The contact between the two liquid phases is performed under conditions causing the polymerizable species in each phase to react to form a polymer at the interface. These conditions will vary with the polymerizable species and the type of polymer, and will be readily apparent to those skilled in the art of the polymers themselves. In many cases, the conditions are satisfied by simple contact of the phases, while in others a catalyst or promoter can be included to promote the polymerization reaction.

Control of the thickness of the resulting polymer can be achieved by selection of the reaction conditions, including the concentrations of the polymerizable species in each phase, the temperature, and the duration of the contact between the two phases. Concentrations are addressed above, and appropriate or optimal temperatures will be readily apparent to those skilled in the art of the polymerization reactions used. Many of the polymerization reactions contemplated by this invention will occur readily at ambient temperature, i.e., from about 20° C. to about 25° C. The contact time is controlled by termination of the phase contact at the desired interval. Termination is readily achieved by either removing the support from the vessel containing the second liquid phase and allowing excess liquid to drain off, rinsing the support with the solvent used in the second liquid phase, or both. The contact times will vary depending on the targeted polymer thickness. In most cases, best results will be obtained with a thickness within the range of from about 50 nm to about 1,000 nm. Contact times can range from 5 seconds to 600 seconds in some cases, 200 seconds to 600 seconds in others, 30 seconds to 200 seconds in still others, 15 seconds to 30 seconds in still others, and 5 seconds to 15 seconds in still others. For most applications a polymer film of appropriate thickness is achieved with contact times within the range of from about 3 seconds to about 3 minutes, and preferably from about 10 seconds to about 1 minute. As an example, when the first liquid phase is a polar reactant phase of 2% (weight/volume) m-phenylenediamine in water and the second liquid phase is a non-polar reactant phase of 0.1% (weight/volume) trimesoyl chloride (with nanotubes suspended therein), a contact time of 10 seconds to 60 seconds at ambient temperature will result in a polyamide layer with a thickness of 150 nm to 300 nm. Monomers that have a relatively large number of functional groups per molecule, such as trimesoyl chloride (with three acyl chloride groups) vs. isophthaloyl chloride (with two acyl chloride groups), will require relatively short contact times. Similarly, increasing the monomer concentration, increasing the temperature, or both, will lessen the contact time required to produce a layer of the desired thickness.

Once all of the polymerization reactions have proceeded to the desired degree, the membrane and underlying support are recovered from the remaining liquids and cleaned or rinsed as needed. Recovery of the completed membrane and support can be achieved by simple evaporation of the liquids, using an elevated temperature if necessary.

As noted above, the polymeric membrane that forms the continuous barrier around the nanotubes is formed in such a manner that its thickness is less than the average length of the nanotubes. Preferably, the membrane has a minimum thickness of one-tenth, and more preferably one-fifth, of the average nanotube length. Still more preferably, the ratio of the average nanotube length to the membrane thickness is from about 1.3 to about 5, and most preferably from about 2 to about 4. Alternatively, the thickness of the membrane is preferably 20% to 90%, more preferably 20% to 70%, and still more preferably 20% to 50%, of the average nanotube length, and in some cases preferably 30% to 80%, more preferably 20% to 70%, and most preferably 50% to 60%, of the average nanotube length. Since the nanotubes, in the liquid phase in which they are initially dispersed, are randomly oriented and since no conditions are imposed on the nanotubes during the phase contact and polymerization stages of the procedure to control their orientation, the final membrane contains embedded nanotubes in a random or irregular arrangement in terms of the distances between neighboring nanotubes and the angles of orientation of individual nanotubes relative to the surfaces of the membrane. Typically, a majority, preferably more than 20%, 30%, 40%, 50%, 60%, 70%, 80%, or 90%, of the nanotubes whose upper and lower ends both protrude from the membrane are in a non-vertical arrangement, forming an angle of 15° to less than 90°, or notably 45°, 50°, 55°, 60°, or 65°, with the surface of the membrane.

As noted above, certain embodiments of the invention involve two distinct liquid applications, rather than one, over the wetted microporous support. Thus, as an alternative to forming the continuous (i.e., essentially nonporous other than the channels formed by the embedded nanotubes) polymeric membrane directly over the microporous support to serve as the barrier, a porous layer can first be formed over the support as an intermediate layer between the support and the continuous or barrier membrane. The intermediate layer can serve any of a variety of functions. One function is to act as a preliminary (or intermediate) filter to remove particulate matter from the fluid to be treated by the membrane that has not been removed by the underlying microporous support. Another function is to serve as an anchor for the nanotubes to ensure that the nanotubes in the continuous (outer) layer that is to be formed over the intermediate layer will have open ends facing the input side of the final membrane. In either case, the porosity of the intermediate layer serves to assure that the critical selectivity function of the membrane remains in the continuous layer.

The intermediate layer can be formed by the same type of interfacial polymerization as the continuous layer, except by using polymerizable species or polymerization conditions that result in a porous, rather than non-porous, layer. The intermediate layer can thus be formed from polymerizable species in two liquid solutions that form separate phases, with the second phase applied over the support that has previously been wetted with the first phase. When the nanotubes are initially confined to the liquid phase that is applied over the wetted support, the polymer layer that is formed will contain a significant number of nanotubes whose lower ends reside within the layer itself while the remaining lengths of these nanotubes and their upper ends extend well above the layer. When carbon nanotubes are used, the nanotubes will typically extend above the polymer layer by several hundred nanometers. The porosity of this layer assures that most or all of the lower ends remain open even when these ends are embedded in the layer. When the continuous layer is then formed over the intermediate layer, the nanotubes will retain their open inlet ends and extend through the continuous layer.

One means of producing intermediate (porous) and outer (continuous) layers that are compatible with each other and yet with different porosities is by using the same type of polymerizable species in each layer but differing in the number of functional groups per species. Thus, when both layers are formed of polyamides, an acid chloride such as isophthaloyl chloride having only two functional groups per molecule can be used for the intermediate layer while an acid chloride such as trimesoyl chloride having three functional groups per molecule can be used for the continuous layer. Alternatively, mixtures of polymerizable species of varying compositions can be used for greater control of the different porosities. For example, mixtures of mono-, di-, and tri-acid chlorides can be used as the non-polar-phase species for both polymerizations, with the mixture used for the intermediate (porous) layer having a higher proportion of mono- and di-acid species and the mixture used for the outer (continuous) layer having a higher proportion of the tri-acid species.

Of the three liquid phases used to form the two layers, the second and third phases are at least partially immiscible, and preferably entirely immiscible, with the first, and the second and third phases both containing dissolved polymerizable species that react with polymerizable species dissolved in the first phase. The polymerizable species in the second phase will be one that forms a porous polymer while that in the third phase will be one that forms a continuous polymer, and the nanotubes can either be dispersed in both the second and third phases or in the second phase only. The layers can be formed in succession by first wetting the support layer with the first liquid phase, then applying the second liquid phase, and finally applying the third, with or without a fresh application of the first liquid phase between the second and third. If the third phase is applied directly after the second phase, the third phase will be applied while the support is still wet with both the first and second phases. In preferred methods of forming the two polymeric layers, the nanotubes are initially present only in the second liquid phase, and once the intermediate porous layer has been formed, the outer continuous layer is applied as a capping layer, i.e., the barrier, over the porous layer and yet one that is sufficiently thin that it the nanotubes extending up from the intermediate layer pass all the way through it.

Membranes and composite membranes of the present invention can be used for the treatment of both liquids and gases, for purposes of separation or purification. The membranes are of particular value when used for reverse osmosis, notably for the desalination of water.

FIG. 1 illustrates a composite membrane 11 within the scope of the invention formed by a single interfacial polymerization step. The composite includes a polymeric membrane 12 with embedded nanotubes 13 formed directly over a microporous support layer 14 which in turn is supported by a layer of non-woven fabric 15. The fabric layer 15 provides structural support to the microporous layer.

Figure 2A:
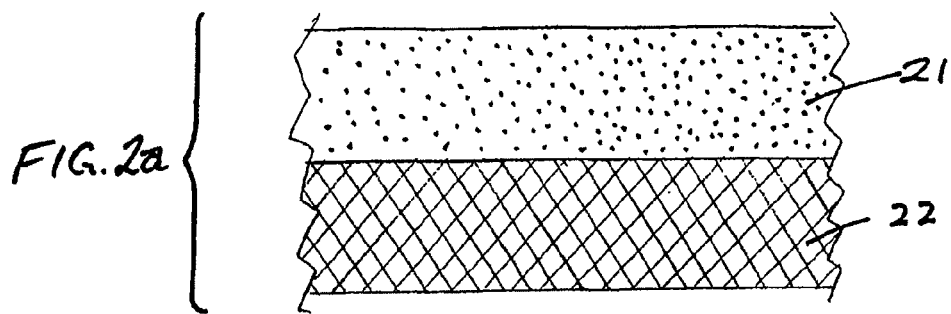
FIG. 2a is a cross section of a substrate for the manufacture of another example of a membrane in accordance with this invention.
Figure 2B:
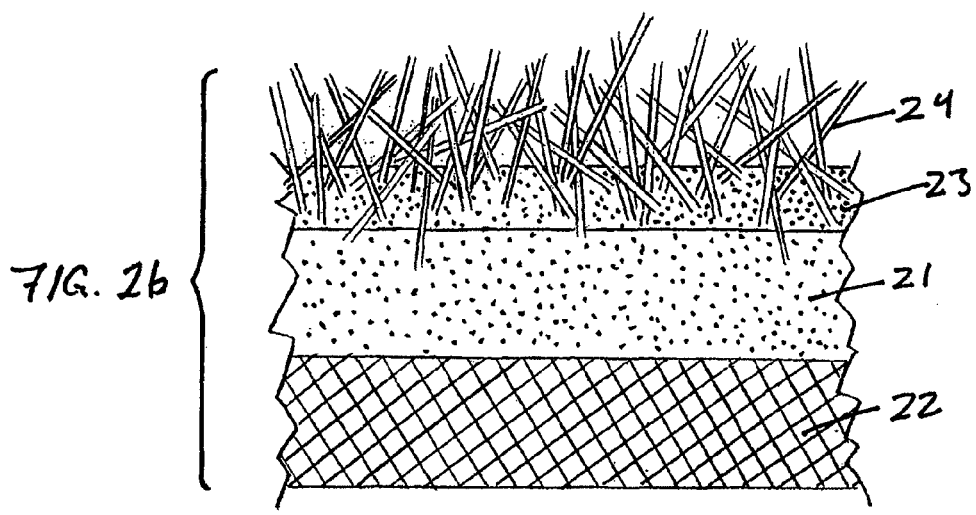
FIG. 2b is a cross section of the same substrate after an intermediate layer containing nanotubes has been applied.
Figure 2C:
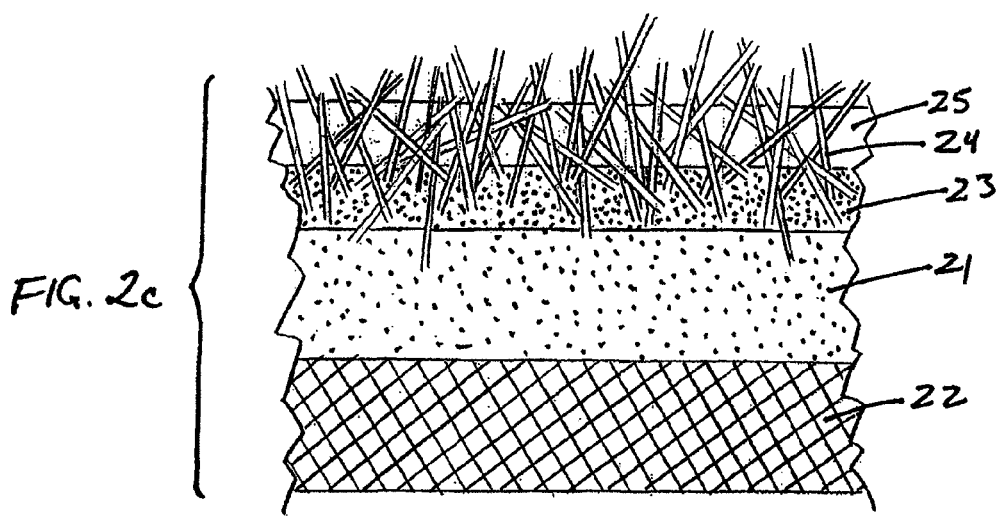
FIG. 2c is cross section of the same substrate after an outer layer has been applied over the intermediate layer.

FIGS. 2a, 2b, and 2c illustrate the manufacture of a second composite membrane within the scope of the invention, this membrane having an intermediate polymeric layer and an outer polymeric layer. FIG. 2a depicts a microporous support layer 21 and an underlying layer of non-woven fabric 22, together serving as the substrate for the polymeric layers to be formed over them. FIG. 2b depicts the microporous and non-woven fabric layers 21, 22 with an intermediate layer 23 applied over the microporous layer 21. The intermediate layer 23 was formed by first wetting the microporous and non-woven fabric layers 21, 22 with a solution of a first monomer in a non-polar solvent to saturate the pores of the microporous layer 21 and then dipping the wetted substrate in a solution of a second monomer in a polar solvent that also contains a dispersion of open-ended nanotubes. The two monomers react with each other at the interface in a polymerization reaction to form the intermediate layer 23 whose thickness is exaggerated in this drawing for ease of visualization. One or both of the monomers has functional groups that are sufficiently limited in number that polymerization results in a porous polymer. Thus formed, the intermediate layer 23 contains the nanotubes 24 embedded in the solid porous polymer in a random orientation, with some of the nanotubes 24 terminating at their lower ends within the polymeric layer 21, while essentially all of the nanotubes extend well above the polymeric layer. The porosity of the polymer keeps the embedded lower ends open. Although not shown, a blocking layer is secured to the lower surface of the non-woven fabric layer 22 (on the side opposite to that occupied by the microporous layer 21) to restrict the interfacial reaction to the exposed surface of the microporous layer 21.

FIG. 2c depicts the composite membrane after the outer layer 25 has been applied. The outer layer 25 was formed by dipping the still wet layers of FIG. 2b in a third solution that contains a third monomer dissolved in a polar solvent and does not contain a dispersion of nanotubes. Due to the porosity of the intermediate layer 23, the first monomer solution is accessible to contact by the third monomer solution for a polymerization reaction at the interface. The third monomer is similar to the second monomer except for a greater number of functional groups per molecule, causing the reaction at the interface to produce a polymer that is significantly less porous than that of the intermediate layer 23, and in fact substantially continuous. The resulting polymer forms the outer layer 25 which is still sufficiently thin to allow the upper ends of the nanotubes 24 to protrude.

None of the figures herein are drawn to scale, and they are only intended to be representative of the procedures for forming the membranes, rather than an actual depiction of the membranes themselves.

The following examples are offered for purposes of illustration and are not intended to limit the scope of the invention.

EXAMPLE 1

Synthesis of Composite Membrane

This example illustrates the formation of a composite membrane consisting of a layer of polyamide over a polyethersulfone microporous support, with single-wall carbon nanotubes embedded in the polyamide layer which is formed by interfacial polymerization directly over the support, in accordance with the invention.

Single-wall carbon nanotubes measuring 1,000 nm in length and 0.8 nm in outer diameter and functionalized with octadecylamine to enhance their solubility in organic solvents were treated by controlled, low-temperature thermal oxidation to open both ends. A non-polar suspension of the nanotubes was prepared by suspending the nanotubes in 50 mL of hexane at a concentration of 0.01% by weight. Trimesoyl chloride was dissolved in the non-polar suspension at a concentration of 0.1% by weight Separately, a polar solution of m-phenyldiamine was prepared by dissolving the diamine in water to a concentration of 2.0% by weight. A polyethersulfone microporous disk measuring 47 mm in diameter and 0.25 mm in thickness was immersed in the polar suspension for five minutes, removed from the solution, then dried on the surface by use of a rubber roller or air gun. The sample was subsequently immersed in the non-polar suspension for sixty seconds. The resulting interfacial polymerization yielded a polyamide/nanotube membrane measuring 50 to 200 nm in thickness and 47 mm in diameter supported on a microporous substrate with nanotubes extending through the membrane to serve as pores for gas or fluid transport.

The procedure of the preceding paragraph can be repeated using single-wall carbon nanotubes of 5 nm inner diameter rather than 0.8 nm outer diameter, to produce a membrane useful for nanofiltration. The procedure can also be repeated using single-wall carbon nanotubes of 50 nm inner diameter to produce a membrane useful for ultrafiltration.

EXAMPLE 2

Synthesis of Composite Membrane

This example illustrates the formation of a composite membrane consisting of two polyamide layers, an intermediate layer and an outer layer, over a polyethersulfone microporous support, with single-wall carbon nanotubes embedded in the polyamide layers, in accordance with the invention.

A procedure similar to that of Example 1 was followed, except that octadecylamine-functionalized single-wall carbon nanotubes 12-14 Å (1.2-1.4 nm) in diameter were used, and the polyethersulfone support was dipped twice, first in a solution of isophthaloyl chloride and then in a solution of trimesoyl chloride, with the nanotubes dispersed in the isophthaloyl chloride solution. The isophthaloyl chloride solution contained 0.1% (by weight) isophthaloyl chloride and 0.01% (by weight) of the nanotubes in hexane, and the immersion in this solution was maintained for ten seconds. The trimesoyl chloride solution contained 0.1% (by weight) trimesoyl chloride in hexane, and immersion in this solution occurred within one to five seconds of the removal of the support from the isophthaloyl chloride solution. Immersion in the trimesoyl chloride solution was maintained for ten seconds. Upon its removal from the trimesoyl chloride solution, the sample was allowed to dry in air for ninety minutes.

Fourteen membranes were prepared in this manner and were tested for desalination of brackish water (2,000 ppm NaCl) with a transmembrane pressure of 200 psi. For comparison, ten control membranes prepared in an identical manner with the same components except without nanotubes were tested, and four measurements were taken on a commercially available salt water reverse osmosis membrane from GE Osmonics® Inc. (Minnetonka, Minn., US) that contains no nanotubes. The procedure was also repeated but with a mixture of 75% hexane and 25% chloroform by weight at the non-polar solvent in the isophthaloyl chloride solution. The averages and standard deviations for both salt rejection and permeability are listed in the table below.

COMPARATIVE TEST RESULTS FOR DESALINATION

| | Salt Rejection (%) | | Permeability ($m^3/m^2$-s-Pa) | |
|---|---|---|---|---|
| | Average | Standard Deviation | Average | Standard Deviation |
| With Nanotubes[1] | 97.69 | 1.09 | $5.12 \times 10^{-12}$ | $8.92 \times 10^{-13}$ |
| With Nanotubes[2] | 99.30 | 0.2 | $9.9 \times 10^{-12}$ | $1.5 \times 10^{-12}$ |
| Without Nanotubes[1] | 96.19 | 1.81 | $2.97 \times 10^{-12}$ | $8.95 \times 10^{-13}$ |
| Osmonics ® | 94.91 | 1.42 | $2.29 \times 10^{-12}$ | $5.74 \times 10^{-13}$ |

[1]With 100% hexane as the first non-polar solvent
[2]With a mixture of 75% hexane and 25% chloroform (by volume) as the first non-polar solvent These results indicate a clear enhancement in permeability for the membranes with nanotubes (within the scope of the invention) relative to those without nanotubes and to commercially available membranes (also without nanotubes).

EXAMPLE 3

(Prophetic) Desalination, Nanofiltration, And Ultrafiltration

The desalination membrane of Example 1 with 0.8 nm outer-diameter nanotubes can be used by forcing one liter of salt water having a concentration of 1 mol/L NaCl against the membrane at a pressure differential sufficient to cause water from the salt water to pass through the nanotubes into a collector. The collected water will have a NaCl concentration of less than 0.1 mol/L, indicating a salt rejection greater than 90%.

The nanofiltration membrane of Example 1 with 5 nm inner-diameter nanotubes can be used by forcing ten milliliters of water containing 5 nm colloidal nanoparticles at a concentration of $5 \times 10^{13}$ particles/mL against the membrane at a pressure differential sufficient to cause water from the colloidal suspension to pass through the nanotubes into a collector. The collected water will have a particle concentration that is below the limit of detection of the analysis technique, indicating that the composite membrane blocks all 5 nm particles from passing through the nanotubes.

The ultrafiltration membrane of Example 1 with 50 nm inner-diameter nanotubes can be used by forcing ten milliliters of water containing 50 nm colloidal nanoparticles at a concentration of $5 \times 10^{13}$ particles/mL against the membrane at a pressure differential sufficient to cause water from the colloidal suspension to pass through the nanotubes into a collector. The collected water will have a particle concentration that is below the limit of detection of the analysis technique, indicating that the composite membrane blocks all 5 nm particles from passing through the nanotubes.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein or any prior art in general and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. A process for the preparation of a membrane of selective permeability, said process comprising:
   (a) wetting with a first liquid phase a microporous support that is wettable by said first liquid phase, said first liquid phase having dissolved therein a first polymerizable species;
   (b) with said microporous support thus wetted, contacting said microporous support with a second liquid phase that is at least partially immiscible with said first liquid phase and in which is dissolved a second polymerizable species, one or both of said first and second liquid phases having carbon nanotubes randomly dispersed therein, said carbon nanotubes being open at both ends and have an average length, said first and second polymerizable species being mutually reactive by interfacial polymerization to form a solid polymer that is insoluble in said first and second liquid phases and that adheres to said microporous support;
   (c) with said first and second liquid phases in contact, causing said first and second polymerizable species to form a layer of said polymer over an outer surface of said microporous support;
   (d) sealing said layer to form a continuous barrier around said carbon nanotubes, said barrier having a thickness that is less than said average length of said carbon nanotubes; and
   (e) recovering from said first and second liquid phases said microporous support with said layer adhering to said outer surface.

2. The process of claim 1 wherein steps (c) and (d) are performed simultaneously and said layer is said barrier.

3. The process of claim 1 wherein steps (c) and (d) are performed in sequence, said layer of step (c) is defined as an intermediate layer and is a porous layer, and step (d) comprises forming an outer layer over said intermediate layer, said outer layer forming said barrier, and said outer layer having a thickness that is less than said average length of said carbon nanotubes.

4. The process of claim 3 wherein step (d) is formed by interfacial polymerization by contacting said intermediate layer with a third liquid phase that is at least partially immiscible with said first liquid phase and in which is dissolved a third polymerizable species that is reactive with one or both of said first and second polymerizable species to form a solid polymer that is insoluble in said first, second, and third liquid phases.

5. The process of claim 4 wherein said microporous support is wettable by a polar liquid, said first liquid phase is a polar liquid, and said second and third liquid phases are non-polar liquids.

6. The process of claim 3 wherein the ratio of said average length of said carbon nanotubes to said thickness of said intermediate and outer layers combined is from about 1.3 to about 5.

7. The process of claim 3 wherein the ratio of said average length of said carbon nanotubes to said thickness of said intermediate and outer layers combined is from about 2 to about 4.

8. The process of claim 3 wherein said intermediate and outer layers have a combined thickness of from about 100 nm to about 300 nm.

9. The process of claim 3 wherein said microporous support is wettable by a polar liquid, said first liquid phase is a solution in a polar solvent selected from the group consisting of water, an alcohol, and a glycol, and said second and third liquid phases are solutions in a non-polar solvent selected from the group consisting of benzene, a halobenzene, an alkyl benzene, a $C_5$-$C_{12}$ alkane, a halo-substituted $C_5$-$C_{12}$ alkane, and an alkyl-substituted $C_5$-$C_{12}$ alkane.

10. The process of claim 3 wherein said first polymerizable species is an aromatic polyamine and said second and third polymerizable species are aromatic polycarboxylic acid halides.

11. The process of claim 1 wherein said carbon nanotubes are single-walled carbon nanotubes.

12. The process of claim 1 wherein said microporous support is wettable by a polar liquid and said first liquid phase is a polar liquid.

13. The process of claim 12 wherein said polar liquid is an aqueous solution.

14. The process of claim 1 wherein said microporous support is wettable by a polar liquid, said first liquid phase is a polar liquid, and said second liquid phase is a non-polar liquid.

15. The process of claim 14 wherein said non-polar liquid is a solution in a solvent that is a mixture of hexane and chloroform at a hexane:chloroform weight ratio of from about 1:1 to about 10:1.

16. The process of claim 14 wherein said non-polar liquid is a solution in a solvent that is a mixture of hexane and chloroform at a hexane:chloroform weight ratio of from about 2:1 to about 5:1.

17. The process of claim 1 wherein the ratio of said average length of said carbon nanotubes to said thickness of said layer is from about 1.3 to about 5.

18. The process of claim 1 wherein said layer has a thickness of from about 50 nm to about 300 nm.

19. The process of claim 1 wherein said microporous support has first and second opposing outer surfaces, and step (b) is performed with said first outer surface blocked to limit formation of said polymer layer to said second outer surface.

20. The process of claim 1 wherein said average length of said carbon nanotubes is from about 100 nm to about 2000 nm.

21. The process of claim 1 wherein said average length of said carbon nanotubes is from about 200 nm to about 1000 nm.

22. The process of claim 1 wherein said carbon nanotubes have inner diameters of 0.4 nm to 5 nm.

23. The process of claim 1 wherein said carbon nanotubes have inner diameters of 0.4 nm to 1.2 nm.

24. The process of claim 1 wherein said carbon nanotubes have inner diameters of 1 nm to 10 nm.

25. The process of claim 1 wherein said carbon nanotubes have inner diameters of 5 nm to 200 nm.

26. The process of claim 1 wherein said microporous support has a molecular weight cutoff of from about 1 kDa to about 10 MDa.

27. The process of claim 1 wherein said microporous support has a molecular weight cutoff of from about 5 kDa to about 300 kDa.

28. The process of claim 1 wherein said layer so formed has a flat surface on a side of said layer opposite said microporous support, and said carbon nanotubes are dispersed in said second liquid phase at a concentration such that said layer so formed contains from about $2.5 \times 10^8$ to about $1 \times 10^{12}$ carbon nanotubes per square centimeter of said flat surface.

29. The process of claim 1 wherein said layer so formed has a flat surface on the side of said layer opposite said microporous support, and said carbon nanotubes are dispersed in said second liquid phase at a concentration such that said layer so formed contains from about $2.5 \times 10^9$ to about $2.5 \times 10^{11}$ carbon nanotubes per square centimeter of said flat surface.

30. The process of claim 1 wherein one of said first and second liquid phases comprises a non-polar solution in a non-polar solvent, and the polymerizable species dissolved in said non-polar solution constitutes from about 0.05 g/100 mL to about 3 g/100 mL of said non-polar solution, and the other of said first and second liquid media comprises a polar solution in a polar solvent, and the polymerizable species dissolved in said polar solution constitutes from about 0.2 g/100 mL to about 5 g/100 mL of said polar solution.

31. The process of claim 1 wherein one of said first and second liquid phases comprises a non-polar solution in a non-polar solvent, and the polymerizable species dissolved in said non-polar solution constitutes from about 0.05 g/100 mL to about 1 g/100 mL of said non-polar solution, and the other of said first and second liquid media comprises a polar solution in a polar solvent, and the polymerizable species dissolved in said polar solution constitutes from about 0.2 g/100 mL to about 2 g/100 mL of said polar solution.

32. The process of claim 1 wherein said microporous support is a member selected from the group consisting of polyethersulfone, polysulfone, nylon, and polyester, and said first liquid phase is a polar phase.

33. The process of claim 1 wherein said microporous support is wettable by a polar liquid, and said first liquid phase is a solution of said first polymerizable species in a polar solvent selected from the group consisting of water, an alcohol, and a glycol, and said second liquid phase is a solution of said second polymerizable species in a non-polar solvent selected from the group consisting of benzene, a halobenzene, an alkyl benzene, a $C_5$-$C_{12}$ alkane, a halo-substituted $C_5$-$C_{12}$ alkane, and an alkyl-substituted $C_5$-$C_{12}$ alkane.

34. A membrane with embedded carbon nanotubes, said membrane comprising a plurality of carbon nanotubes open at both ends and embedded in a solid, continuous polymeric matrix which is sealed around the nanotubes, said polymeric matrix having a thickness that is less than an average of the lengths of said carbon nanotubes, said carbon nanotubes having substantially random orientations relative to said matrix and yet oriented such that at least a portion of said plurality of carbon nanotubes each have both respective open ends protruding from opposite sides of said matrix to provide fluid communication through each of said portion of said plurality of said carbon nanotubes through said membrane.

35. The membrane of claim 34 further comprising a layer of microporous material supporting said polymeric matrix, said layer of microporous material containing no carbon nanotubes.

36. The membrane of claim 34 wherein the ratio of said average of the lengths of said carbon nanotubes to said thickness of said polymeric matrix is from about 1.3 to about 5.

37. The membrane of claim 34 wherein the ratio of said average of the lengths of said carbon nanotubes to said thickness of said polymeric matrix is from about 2 to about 4.

38. The membrane of claim 34 wherein said polymeric matrix has a thickness of from about 50 nm to about 300 nm.

39. The membrane of claim 34 wherein said average length of said carbon nanotubes is from about 100 nm to about 2000 nm.

40. The membrane of claim 34 wherein said average length of said carbon nanotubes is from about 200 nm to about 1000 nm.

41. The membrane of claim 34 wherein said carbon nanotubes have inner diameters of 0.4 nm to 1.2 nm.

42. The membrane of claim 34 wherein said polymeric matrix is non-porous and has a substantially planar surface and contains from about $2.5 \times 10^8$ to about $1 \times 10^{12}$ carbon nanotubes per square centimeter of said surface.

43. The membrane of claim 34 wherein said polymeric matrix has a substantially planar surface and contains from about $2.5 \times 10^9$ to about $2.5 \times 10^{11}$ carbon nanotubes per square centimeter of said surface.

44. The membrane of claim 34 wherein said polymeric matrix is a polyamide.

45. The membrane of claim 34 wherein said polymeric matrix is an aromatic polyamide.

46. A method for desalination of water, said method comprising passing said water through a membrane comprising a plurality of carbon nanotubes open at both ends and embedded in a solid, continuous polymeric matrix which is sealed around said carbon nanotubes, said polymeric matrix having a thickness that is less than an average of the lengths of said carbon nanotubes, said carbon nanotubes having substantially random orientations relative to said matrix and yet oriented such that at least a portion of said plurality of carbon nanotubes each have both respective open ends protruding from opposite surfaces of said matrix such that the water flows through said membrane through an interior of each of said portion of said plurality of said carbon nanotubes to desalinate the water.

47. The method of claim 46 wherein said membrane further comprises a layer of microporous material supporting said polymeric matrix, said layer of microporous material containing no carbon nanotubes.

48. The method of claim 46 wherein the ratio of said average of the lengths of said carbon nanotubes to said thickness of said polymeric matrix is from about 1.3 to about 5.

49. The method of claim 46 wherein the ratio of said average of the lengths of said carbon nanotubes to said thickness of said polymeric matrix is from about 2 to about 4.

50. The method of claim 46 wherein said polymeric matrix has a thickness of from about 50 nm to about 300 nm.

51. The method of claim 46 wherein said average length of said carbon nanotubes is from about 100 nm to about 2000 nm.

52. The method of claim 46 wherein said average length of said carbon nanotubes is from about 200 nm to about 1000 nm.

53. The method of claim 46 wherein said carbon nanotubes have inner diameters of 0.4 nm to 5 nm.

54. The method of claim 46 wherein said carbon nanotubes have inner diameters of 0.4 nm to 1.2 nm.

55. The method of claim 46 wherein said polymeric matrix is non-porous and has a substantially planar exposed outer surface and contains from about $2.5 \times 10^8$ to about $1 \times 10^{12}$ carbon nanotubes per square centimeter of said exposed outer surface.

56. The method of claim 46 wherein said polymeric matrix has a substantially planar exposed outer surface and contains from about $2.5 \times 10^9$ to about $2.5 \times 10^{11}$ carbon nanotubes per square centimeter of said exposed outer surface.

57. The method of claim 46 wherein said polymeric matrix is a polyamide.

58. The method of claim 46 wherein said polymeric matrix is an aromatic polyamide.

\* \* \* \* \*